United States Patent [19]

Kass et al.

[11] Patent Number: 5,249,284
[45] Date of Patent: Sep. 28, 1993

[54] METHOD AND SYSTEM FOR MAINTAINING DATA COHERENCY BETWEEN MAIN AND CACHE MEMORIES

[75] Inventors: William J. Kass, Easley; Michael R. Hilley, Belton; Lee W. Hoevel, Clemson, all of S.C.

[73] Assignee: NCR Corporation, Dayton, Ohio

[21] Appl. No.: 807,428

[22] Filed: Dec. 13, 1991

Related U.S. Application Data

[63] Continuation of Ser. No. 533,190, Jun. 4, 1990, abandoned.

[51] Int. Cl.⁵ .................................. G06F 12/12
[52] U.S. Cl. .................... 395/425; 364/DIG. 1; 364/243; 364/243.41; 364/247; 364/265.3; 364/285
[58] Field of Search .............. 395/425, 575; 371/21.1

[56] References Cited

U.S. PATENT DOCUMENTS

| | | | |
|---|---|---|---|
| 4,410,944 | 10/1983 | Kronies | 395/425 |
| 4,423,479 | 12/1983 | Hanson et al. | 395/425 |
| 4,622,631 | 11/1986 | Frank et al. | 364/200 |
| 4,695,943 | 9/1987 | Keeley et al. | 364/200 |
| 4,755,930 | 7/1988 | Wilson, Jr. et al. | 364/200 |
| 4,768,148 | 8/1988 | Keeley et al. | 364/200 |
| 4,825,360 | 4/1989 | Knight, Jr. | 364/200 |
| 4,833,601 | 5/1989 | Barlow et al. | 364/200 |
| 4,928,225 | 5/1990 | McCarthy et al. | 364/200 |
| 4,939,641 | 7/1990 | Schwartz et al. | 364/200 |
| 5,008,813 | 4/1991 | Crane et al. | 395/425 |
| 5,148,533 | 9/1992 | Joyce et al. | 395/425 |

FOREIGN PATENT DOCUMENTS 0288649  11/1988  European Pat. Off.

OTHER PUBLICATIONS

"Compact Global Table for Management of Multiple Caches", IBM Technical Disclosure Bulletin, v. 32, No. 7, Dec. 1989, pp. 322-324.

Tehranian, "Twin Cache Tags Enable Concurrent Micro/DMA Processing", Computer Design, v. 24, No. 8, Jul. 1985, pp. 157-159.

Primary Examiner—Debra A. Chun
Attorney, Agent, or Firm—Douglas S. Foote

[57] ABSTRACT

A method and system of maintaining coherency for a data block transferred from a main memory to a cache memory. The data transfer is recorded in a tag register in the main memory. An overwrite of the data block is detected by comparing main memory data writes with the recorded transfer. The cache memory is only notified in the event an overwrite is detected. An invalid flag is then set in the cache.

23 Claims, 5 Drawing Sheets

METHOD AND SYSTEM FOR MAINTAINING DATA COHERENCY BETWEEN MAIN AND CACHE MEMORIES

This is a continuation of co-pending application Ser. No. 07/533,190 filed on Jun. 4, 1990 now abandoned.

The present invention relates to computer memory systems. More particularly, it relates to a method and system of maintaining coherency for data transferred from a main memory to a processor cache memory.

BACKGROUND OF THE INVENTION

The performance of a computer system can be enhanced by the use of a memory hierarchy. For example, a three tiered memory can be constructed from low, medium, and high speed memories. A low speed memory may be a magnetic disk for low cost, bulk storage of data. A medium speed memory may be constructed from DRAMs for use as the computer system's main memory. A high speed memory may employ SRAMs for use as a processor cache memory. The theory behind memory hierarchy is to group instructions and data to be executed by the system processor in the highest speed memory. Such high speed memory is typically the most expensive memory available, so economics dictate that it be relatively small. Main memory consisting of DRAMs is denser and less expensive than a cache memory with SRAMs, and can therefore be significantly larger than the cache memory.

During operation, the system processor transfers instructions and data from system memory to the cache memory in order to have quick access to the variables of the currently executing program. As additional data, not in the cache, is required, such data is transferred from the main memory by replacing selected data in the cache. Various techniques or algorithms are utilized to determine which data is replaced. Since the data in the cache is duplicative of data in the main memory, changes to data in one memory must similarly be changed or noted in the other memory. The problem of maintaining consistency between the cache and main memory data is referred to as coherency. For example, if the data in the cache is modified, the corresponding data in the main memory must similarly be modified. A scheme for modifying data in the main memory at the same time as data in the cache is known as a write-through cache. Alternatively, if only the cache memory data is modified, then such modified cache data must overwrite the main memory data when it is replaced.

In many computer systems, typically large systems, the main memory may be accessed by devices other than the system processor. For example, data may be written to the main memory by another device while the processor is operating on data in its cache. If the data written to main memory overwrites data presently in the cache, a coherency problem is presented. In the past, a method such as bus snooping has been used. This involves monitoring a bus for writes to main memory and then checking a tag directory associated with the cache to see if the data is in the cache. If present, a flag is set in the cache tag directory to invalidate the entry so that the old data is not used by the processor. Since the processor is responsible for checking the cache tag directory, processing time is consumed. This problem is further exaggerated because multiple devices tend to primarily use their own areas of memory, so most writes to main memory from other devices will not affect the data presently in the processor cache. System performance deteriorates when the processor must take time to check the cache tag directory for data which is not presently residing therein.

OBJECTS OF THE INVENTION

It is therefore an object of the present invention to provide a new and improved method of maintaining coherency for data transferred from one memory to another.

It is another object of the present invention to provide a new and improved system of maintaining coherency for data transferred from one memory to another.

It is a further object of the present invention to provide a method and system for maintaining data coherency which improves system performance.

It is yet another object of the present invention to provide a system and method of maintaining data coherency within a multi-port main memory system.

SUMMARY OF THE INVENTION

The present invention is a method and system of maintaining coherency for a data block transferred from a main memory to a cache memory. The data transfer is recorded in a tag register in the main memory. An overwrite of the data block is detected by comparing data transfers to the main memory with the recorded transfer. The cache memory is only notified in the event of an overwrite.

DESCRIPTION OF A PREFERRED EMBODIMENT

Figure 1A:
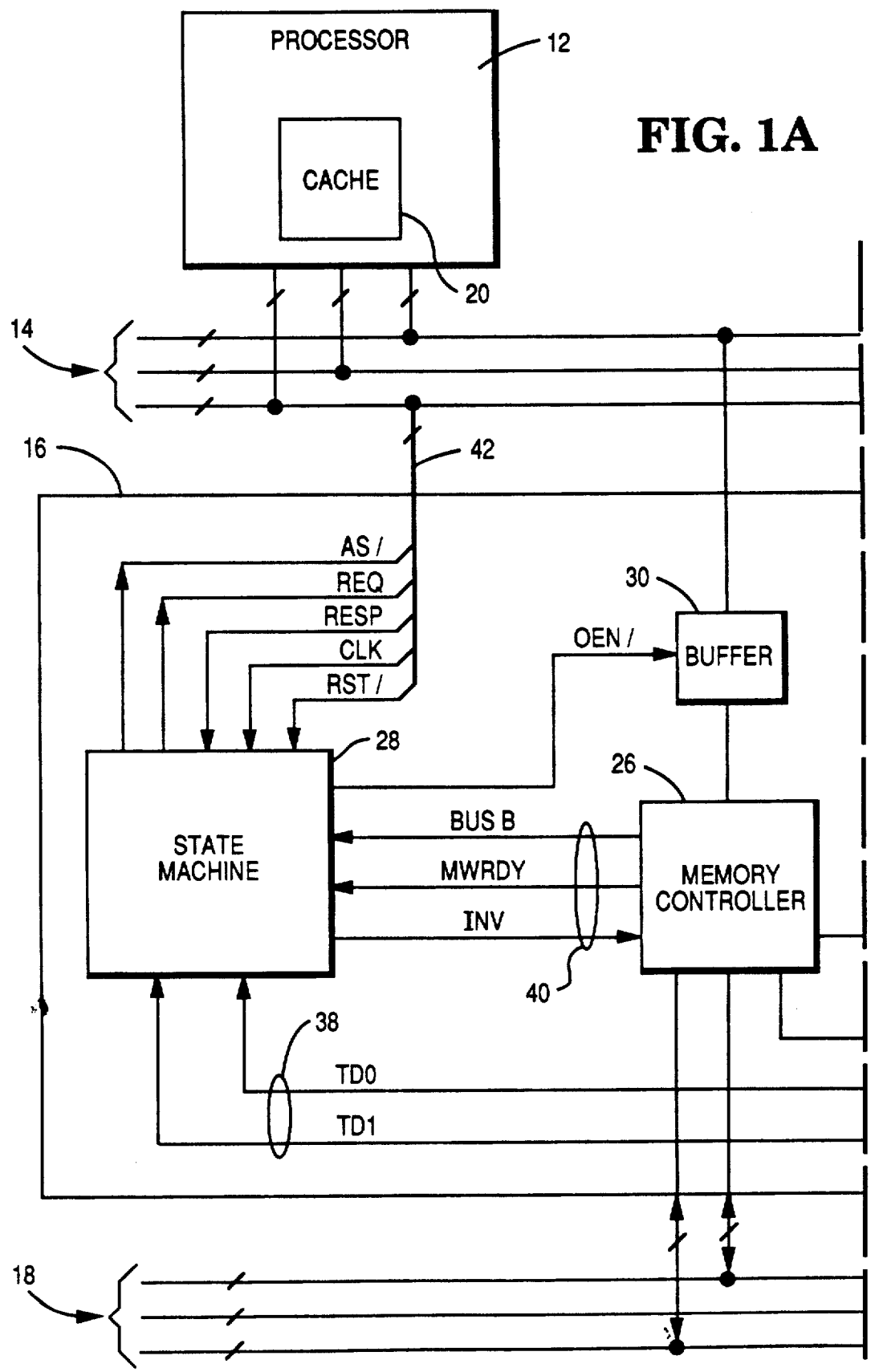
FIGS. 1A and 1B are a block diagram of a memory control system for maintaining data coherency according to one form of the present invention.
Figure 1B:
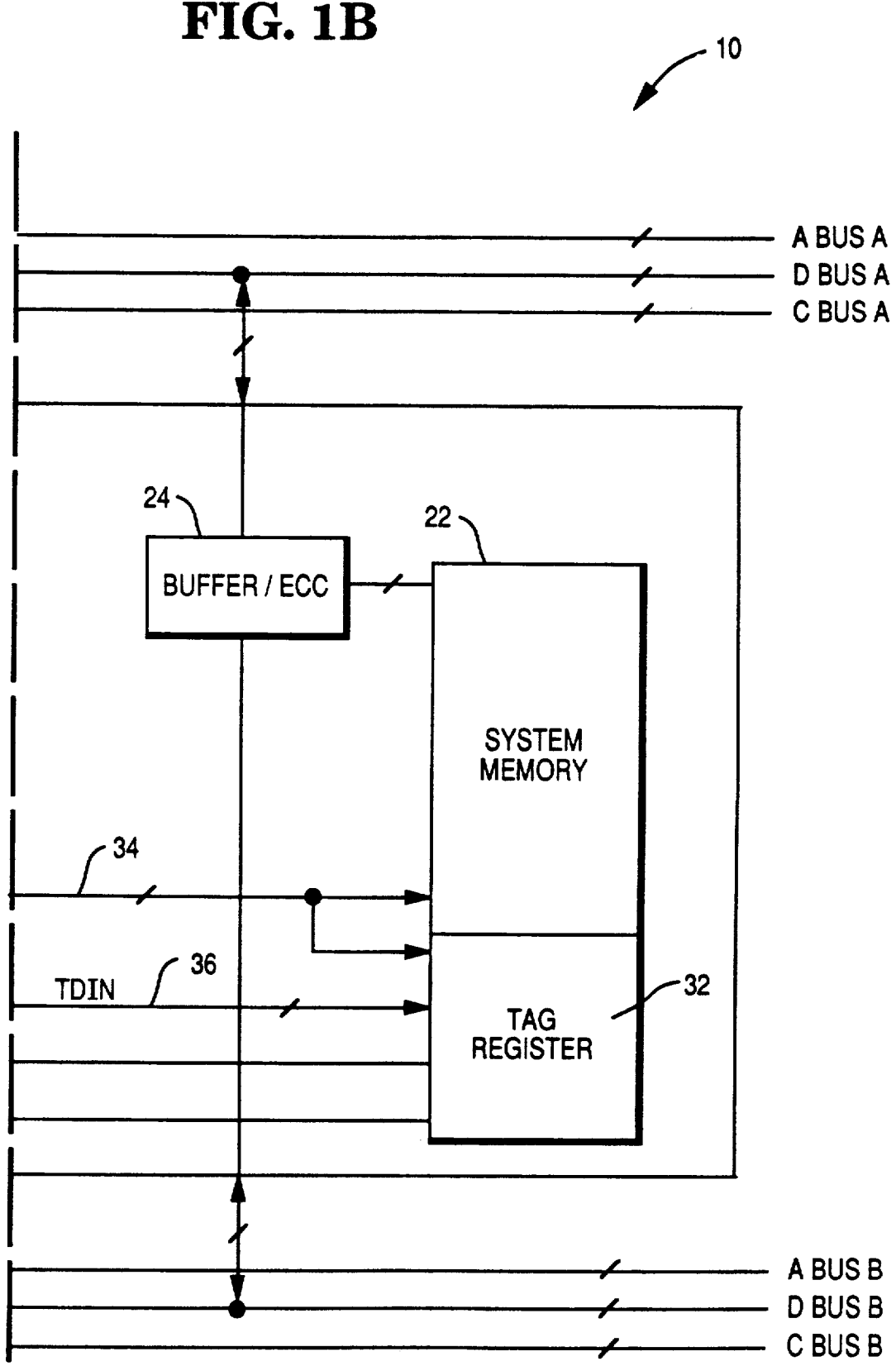

FIGS. 1A and 1B show a portion of a computer system 10 having a processor 12 connected to a bus 14, and a memory card 16 connected between bus 14 and a bus 18. Processor 12 includes a memory cache 20 for high speed, processor memory accesses. Memory card 16 has a system memory 22 which in a preferred embodiment consists of a number of DRAM chips. Memory card 16 also includes data buffers and error checking circuitry 24, a memory controller 26, state machine 28 and address buffers 30. Bus 14 consists of address, data and control busses ABUSA, DBUSA and CBUSA, respectively. Bus 18 consists of address, data and control busses ABUSB, DBUSB and CBUSB, respectively. System memory 22 is connected to, and may be accessed from busses 14 and 18, whereas memory cache 20 is connected solely to bus 14. During start up of computer system 10, data is transferred into memory 22 from nonvolatile storage such as a magnetic disk, preferably connected to bus 18. Processor 12 selects data from memory 22 to be written into its cache 20 for execution. Since cache 20 can only hold a fraction of the data in memory 22, processor 12 is constantly replacing data in cache 20 with new data from memory 22.

Data that is written from memory 22 into cache 20 resides in both locations until the cache data is replaced with new data from memory 22. During the time when data resides in both cache 20 and memory 22, modifications to such data in either location raises the coherency issues discussed previously. If processor 12 modifies data in cache 20, the change must also be made to the data in memory 22. In a preferred embodiment of the present invention, cache 20 is a write-through cache which means that any write from processor 12 to cache 20 is performed simultaneously with a write to the same memory location in memory 22.

Data in memory 22 may also be modified by other devices connected to either bus 14 or 18. For example, data in memory 22 may be overwritten by a device connected to bus 18. The present invention addresses the coherency issue raised when data that is overwritten in memory 22 also resides in cache 20.

System memory 22 includes a tag register 32. Each addressable location in tag register 32 corresponds to a block of data in memory 22. For example, if a data block consists of sixteen bytes of data, a single location in tag register 32 is assigned to each sixteen bytes. As will be discussed more fully, each such tag register location preferably stores two bits for each corresponding data block. Tag register 32 is connected to memory controller 26 by signal lines 34 and 36. Signal line 34 provides address signals (for example, from data transfers to memory 22) to tag register 32 in the form of memory address, write enable, row address strobe (RAS) and column address strobe (CAS) signals. Signal line 36 provides tag data into register 32 (TDIN). Tag register 32 is also connected to state machine 28 by signal line 38 which provides tag data bits TD0 and TD1 to state machine 28.

State machine 28 is logically connected between tag register 32 and cache memory 20. State machine 28 is connected to memory controller 26 by signal lines 40. Signal lines 40 provide state machine 28 with signals BUSB and MWRDY which indicate when data in system memory 22 is being overwritten by an entity connected to bus 18. More particularly, the BUSB signal is active when data is being received from bus 18, and the MWRDY signal is active when a system memory write has been completed. In the embodiment described, processor 12 is the only entity on bus 14 which transfers data to memory 22. Thus, an overwrite received from bus 14 should not activate state machine 28. The MWRDY signal is provided to assure that an invalidation cycle is not started by state machine 28 until after memory 22 has actually been overwritten. Signal lines 40 also provide an invalidation signal INV to memory controller 26 requesting that the tag register 32 be cleared or reset, as will be discussed more fully.

Memory controller 26 arbitrates between read/write requests from busses 14 and 18 for access to system memory 22, and converts the bus address to a memory address, write enable, RAS and CAS signals for memory 22. The invalidation signal INV received from state machine 28 is treated as another request for access to memory. However, because of the importance of data coherency, it is preferred to give it the highest priority. When received by memory controller 26, tag register 32 is accessed and the tag bits reset to zero.

State machine 28 is connected to processor 12 and cache 20 by control line 42. Processor 12 provides clock CLK and reset RST/ signals to state machine 28 over line 42. State machine 28 provides an interrupt request signal REQ to processor 12 and receives an acknowledge signal RESP in response thereto. State machine 28 also provides an output enable signal to buffers 30 when the address of the overwritten data is to be placed on bus 14, and provides a signal AS/ to processor 12 indicating that the address of the data byte to be invalidated is on bus 14.

Figure 2A:
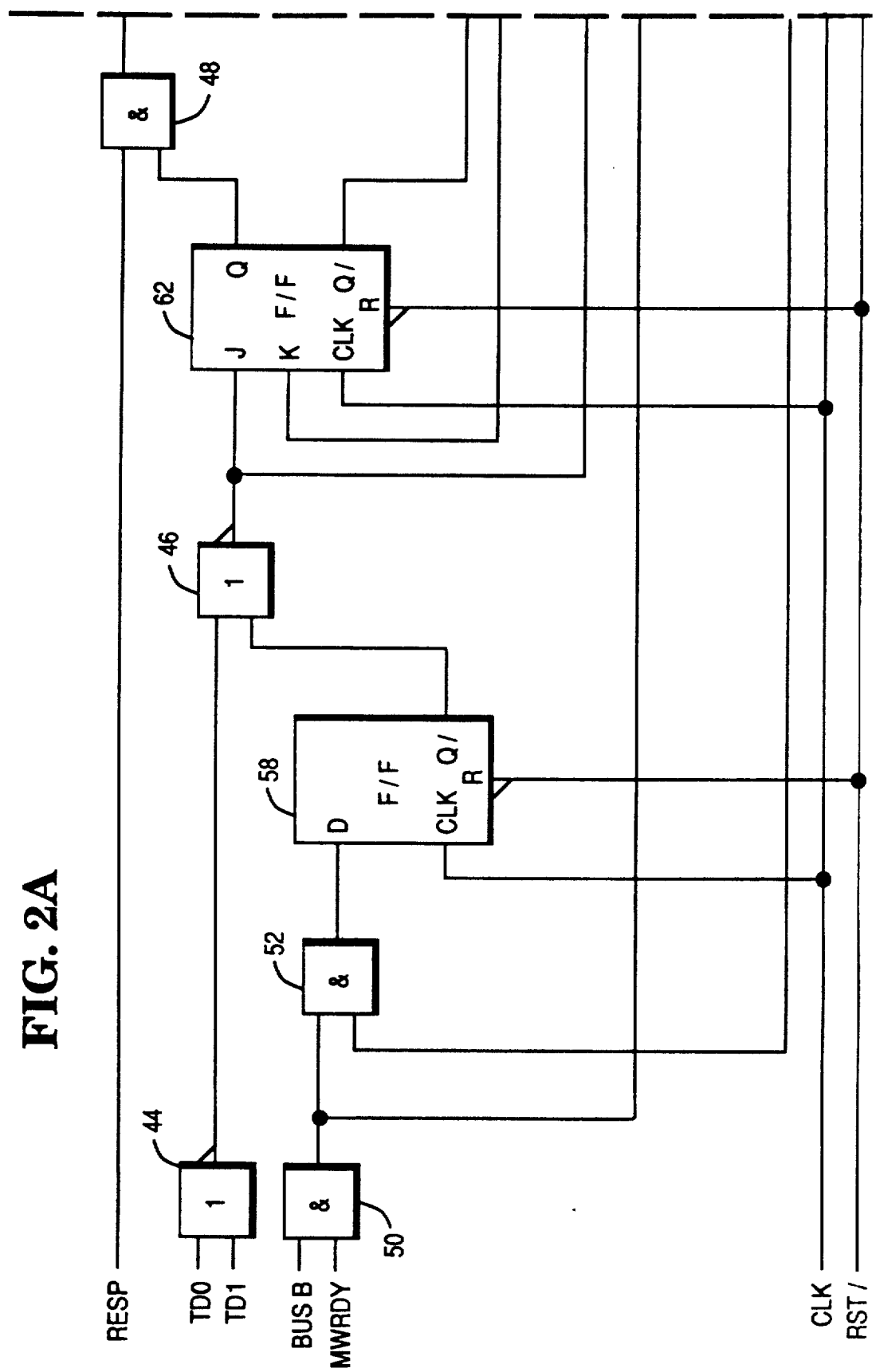
FIGS. 2A and 2B are a circuit diagram of the state machine shown in FIGS. 1A and 1B.
Figure 2B:
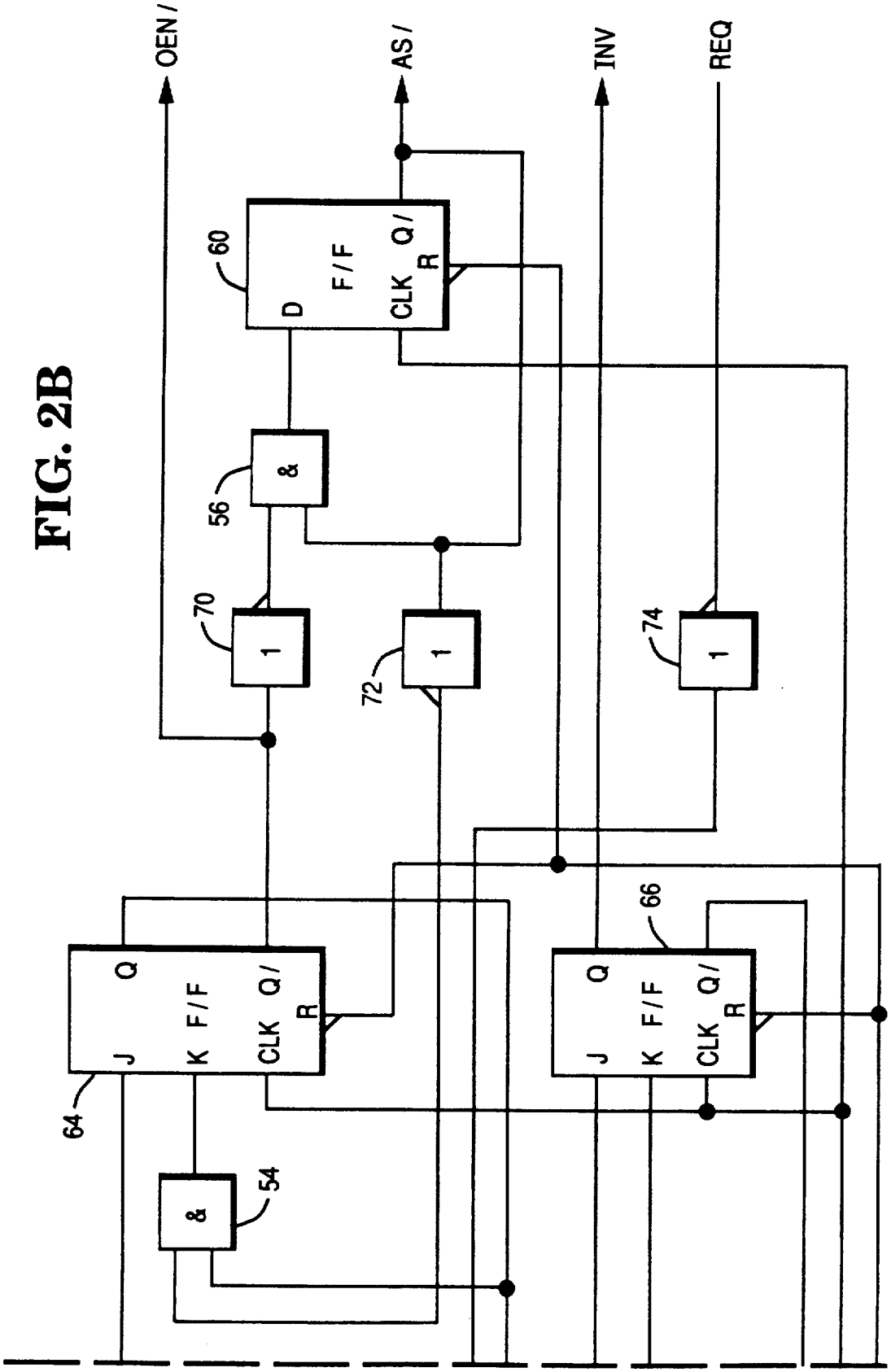

FIGS. 2A and 2B show a circuit diagram of state machine 28. State machine 28 includes NOR gates 44 and 46, AND gates 48, 50, 52, 54 and 56, D-type flip-flops 58 and 60, JK flip-flops 62, 64 and 66, and inverters 70, 72 and 74, connected as shown. As noted previously, two bits may be stored at each location in tag register 32 (FIG. 1B) corresponding to a data block in memory 22. The two bits are both set when a data block is written to cache 20, thereby providing redundancy to the system. As shown in FIG. 2A, these two bits TD0 and TD1 are received by NOR gate 44, so if either one is a "1" the output of NOR gate 44 is "0".

In operation, data blocks are written from memory 22 into cache 20 for fast access by processor 12. These transfers are recorded in memory 22 by setting the tag bits to "1" in tag register 32 at a location corresponding to the address of the subject data block in memory 22. Referring to the flow diagram of state machine 28 shown in FIG. 3, writes to system memory 22 from bus 14 and any reads from memory 22 are ignored by state machine 28 as indicated by the idle state (block 76). An invalidation cycle requires bus 18 activity (BUSB signal) which results in a write to memory 22 (MWRDY signal).

The data transfer to memory 22 from bus 18 is compared to previous data transfers from memory 22 to cache 20. This is achieved by checking the tag bits at the corresponding location in register 32. Whenever memory 22 is accessed for a write, the same address is used to access tag register 32 and the contents, TD0 and TD1, of the corresponding addressed location are provided on line 38. The two tag data bits TD0 and TD1 are checked by state machine 20 (block 78). If either tag bit has been set, an overwrite has been detected. Only a single tag bit is actually needed; however, two bits provide a margin should one bit be bad. If both bits are zero (indicating that the corresponding data block in memory 22 has not been written to cache 20), state machine 28 returns to an idle state (block 76).

Figure 3:
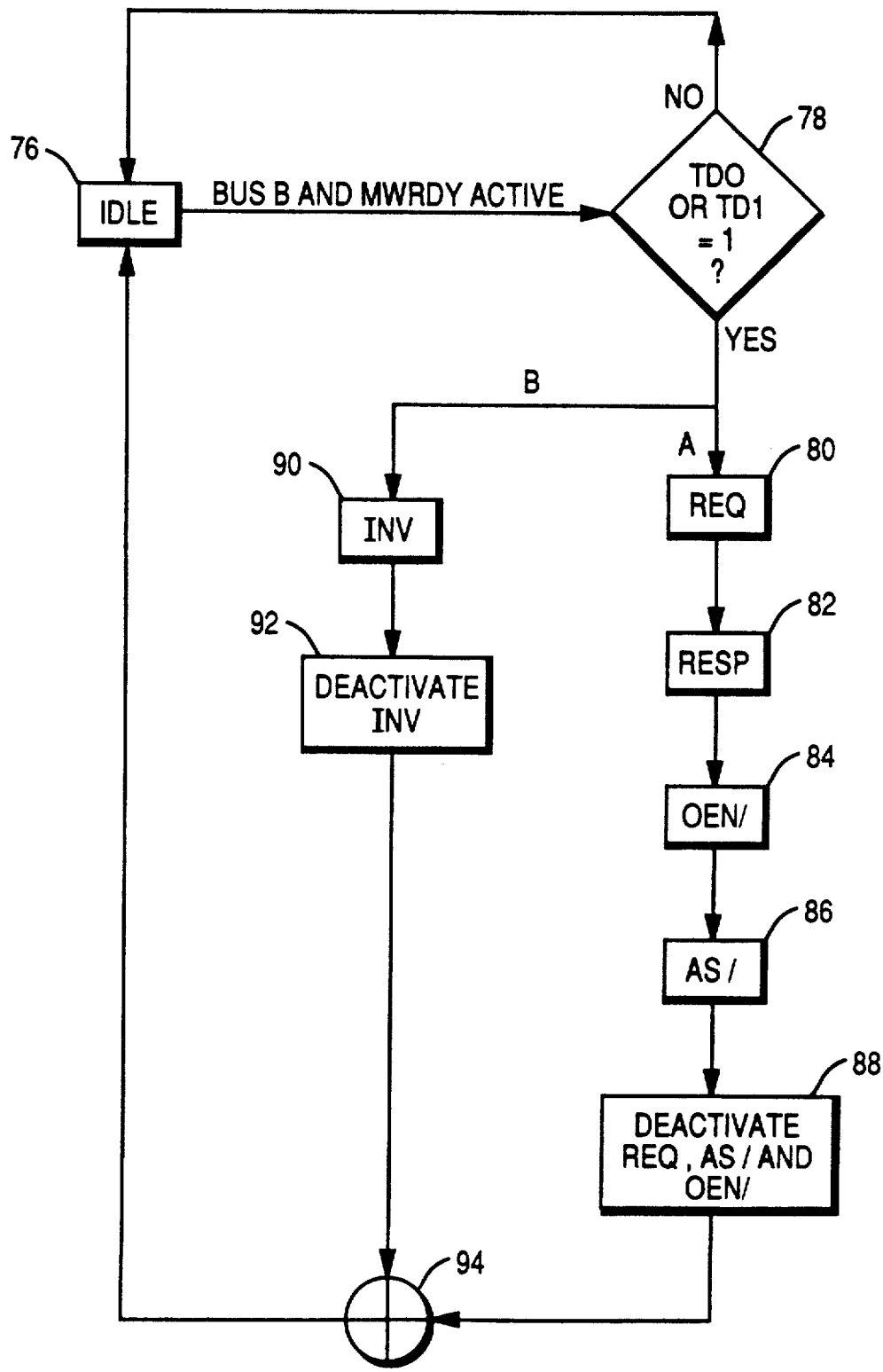
FIG. 3 is a flow diagram depicting an invalidation cycle according to one form of the present invention.

If at least one of the tag bits TD0 or TD1 is "1", an invalidation cycle is commenced. As shown in FIG. 3, two parallel operations are undertaken. Path A shows the sequence of notifying cache 20 of the overwrite. Path B shows the sequence of resetting the tag bits in register 32.

Referring first to path A, the REQ signal is generated (block 80) to inform processor 12 that an entry in cache 20 is invalid. Processor 12 provides the RESP signal (block 82) when it is ready to receive the address of the invalidated data block. The address of the overwritten data block is placed on the address line ABUSA of bus 14 by enabling the output of address buffers 30 with the OEN/ signal (block 84). The address is then strobed into processor 12 by AS/ (block 86). The REQ, OEN/ and AS/ signals are then deactivated (block 88).

Referring to FIGS. 2A and 2B, REQ is active when the BUSB and MWRDY signals are an active "1" and at least TD0 or TD1 is a "1". The output of AND gate 50 is "1" and, in the idle condition, flip-flop 66 provides a Q/ output of "1". The output of AND gate 52 is "1", the Q/ output of flip-flop 58 goes to "0" to sample NOR gate 44 which is a "0", and the output of NOR gate 46 goes to a "1". This sets the Q/ output of flip-flop 62 to "0" which inverter 74 converts to a "1" (REQ). REQ is then transmitted to processor 12 as an interrupt request signal. Processor 12 acknowledges the request when it is ready to respond to an invalidation cycle by providing a high RESP signal. This drives the output of AND gate 48 high which sets the Q/ output of flip-flop 64 to a "0" which is the output enable signal OEN/. Referring to FIG. 1A, OEN/ is received by address buffers 30 which place the address of the overwritten data block on the address line ABUSA of bus 14. Referring again to FIGS. 2A and 2B, the output of AND gate 56 is "1" which activates the address strobe signal AS/ so that the address on ABUSA is strobed into processor 12. The Q/ output of flip-flop 60 feedsback to AND gate 56 which resets the AS/ signal on the next CLK signal. The Q/ output of flip-flop 60 is also provided through inverter 72 to AND gate 54 and along with the Q output feedback from from flip-flop 64 resets flip-flop 64 and OEN/. The Q output of flip-flop 64 is also provided to the K input of flip-flop 62 to reset REQ at the same time AS/ is generated.

Memory cache 20 includes a location corresponding to each data block stored therein for indicating whether the corresponding data block in valid or invalid. When processor 12 receives the address of the invalid data block, a flag is set in the corresponding memory location. The invalidated data will not thereafter be used by processor 12. The flags are reset when new data is overwritten into cache 20.

Referring now to path B in FIG. 3, the INV signal is generated (block 90) by flip-flop 66 to request memory controller 26 (FIGS. 1A and 1B) to clear the location in tag register 32 holding bits TD0 and TD1 for the invalidated data block. Memory controller 26 writes "0's" to the appropriate location in register 32 over line 36. The INV signal is then deactivated (block 92). When the operations on both paths A and B are complete, state machine 28 returns to its idle state 76. It will be noted from FIGS. 2A and 2B that the INV signal is deactivated when the BUSB and MWRDY signals are next active and a "1" is provided to the K input of flip-flop 66. This occurs when the tags have been cleared.

In summary, the present invention maintains coherency between data in main memory 22 and cache memory 20 by interrupting processor 12 only when a data block residing in cache 20 has been overwritten in memory 22.

It will be clear to those skilled in the art that the present invention is not limited to the specific embodiment disclosed and illustrated herein. For example, the invention may be extended to include a main memory connected to a number of busses, with processors and associated cache memories connected to selected ones of the busses. The tag register in the main memory can be provided with one or more bits for each of the data busses or cache memories. When a data block in the main memory is written into a cache on one of the busses, a tag bit or bits in the corresponding location in the tag register is/are set. Any overwrite of such data block from other than the bus with the cached data block will initiate an invalidation cycle.

Numerous modifications, variations, and full and partial equivalents can be undertaken without departing from the invention as limited only by the spirit and scope of the appended claims.

What is desired to be secured by Letters Patent of the United States is as follows.

What is claimed is:

1. A method of maintaining coherency for a first data block transferred from a first memory to a second memory, wherein said first memory stores a plurality of data blocks, the method comprising:
   creating a tag register in said first memory having addressable locations corresponding to each data block in said first memory, each location having a one-to-one correspondence with a data block in said first memory;
   setting a tag bit in said tag register at a location corresponding to the address of said first data block;
   overwriting said first data block in the first memory with a second data block;
   detecting the overwriting of said first data block by examining the tag bit; and
   notifying said second memory of the overwriting.

2. The method of claim 1 wherein said detecting step includes:
   reading said register with the address of data written to said first memory.

3. The method of claim 2 further comprising:
   resetting said tag bit while notifying said second memory of said overwrite.

4. The method of claim 1 further comprising:
   setting an invalid flag in said second memory at a location corresponding to said overwritten data block.

5. The method of claim 1 wherein said first memory is connected to first and second busses, said second memory is connected to said first but not second bus, and wherein said data transfers to said first memory are received from said second data bus.

6. The method of claim 1 wherein said first memory is a main memory and said second memory is a cache memory.

7. The method of claim 6 wherein said cache memory is associated with a processor and wherein said notifying step includes:
   transmitting an interrupt signal to said processor.

8. A method of maintaining coherency for a data block transferred from a main memory to a cache memory comprising:
   providing said main memory with a tag register;
   recording said transfer by setting a tag bit in said register at a location corresponding to the address of said data block;
   detecting an overwrite of said data block by reading said register with the address of data written to said main memory;
   notifying said cache memory of said overwrite;
   resetting said tag bit while notifying said cache memory of said overwrite; and
   setting an invalid flag in said cache memory at a location corresponding to said overwritten data block.

9. The method of claim 8 wherein said main memory is connected to first and second busses, said cache memory is connected to said first but not second bus, said data transfers to said main memory are received from said second data bus, said cache memory is associated with a processor and wherein said notifying step includes:
   transmitting an interrupt signal to said processor.

10. The method of claim 9 wherein said cache is a write-through cache.

11. A method for maintaining data coherency between a main memory connected to a plurality of busses and a plurality of cache memories connected to respective ones of said busses, wherein said main memory stores a plurality of data blocks, the method comprising:

providing a register in said main memory having addressable locations corresponding to each data block in said main memory, each location having a one-to-one correspondence with a data block in said main memory, each location having a plurality of bit positions, and each position corresponding to a respective one of said busses;

transferring a data block from said main memory to a first cache memory on a first bus;

setting a tag bit in said register at a location corresponding to the transferred data block and at the bit position corresponding to said first bus;

addressing said register with the address of data written to said main memory to determine if a tag bit is set indicating an overwrite of said transferred data block; and notifying said first cache of said overwrite.

12. The method of claim 11 further comprising:
setting an invalid flag in said first cache memory at a location corresponding to said overwritten first data block.

13. The method of claim 12 wherein said first cache memory is a write-through cache.

14. The method of claim 11 further comprising:
resetting said tag bit while notifying said first cache of said overwrite.

15. A method of maintaining data coherency between a main memory and a plurality of cache memories, wherein said main memory stores a plurality of data blocks, the method comprising:

providing a register in said main memory having addressable locations corresponding to each data block in said main memory, each location having a one-to-one correspondence with a data block in said main memory, each location having a plurality of bit positions, and each position corresponding to a respective one of said cache memories;

transferring a first data block from said main memory to a first of said cache memories;

setting a first tag bit in said register at a location corresponding to the transferred data block and at the bit position corresponding to said first cache memory;

addressing said register with the address of data written to said main memory to determine if a tag bit is set indicating an overwrite of said first data block; and notifying said first cache of an overwrite.

16. A system of maintaining coherency for a first data block transferred from a first memory to a second memory when a second data block is transferred to said first memory, wherein said first memory stores a plurality of data blocks, the method comprising:

a register having addressable locations, each location corresponding to a data block in said first memory and each location having a one-to-one correspondence with a data block in said first memory, wherein a first of said locations has a tag bit; and means connected to said register and second memory for detecting an overwrite of said data block by examining the tag bit in said first location and for notifying said second memory of said overwrite.

17. The system of claim 16 wherein said detecting means includes:
a signal line connected to said register for receiving address signals from data transfers to said first memory.

18. The system of claim 17 wherein said detecting means further includes:
a state machine connected between said register and said second memory for receiving signals indicating whether said data block is being overwritten.

19. The system of claim 18 wherein said system further comprises a processor associated with said second memory means, and wherein said detecting means includes:
a control line connecting said state machine to said processor for providing an interrupt signal when said data block is overwritten.

20. The system of claim 16 wherein said first memory is a main memory and said second memory is a cache memory.

21. The system of claim 16 further comprising:
first and second busses;
wherein said first memory is connected to both busses and said second memory is connected solely to said first bus.

22. The system of claim 21 further comprising:
a third memory connected solely to said second bus;
wherein each addressable location in said register has a bit corresponding to each of said busses.

23. A system which detects when a first data element is overwritten by a second data element in a memory comprising:
a tag register in the memory for storing a tag bit for the first data element, said register having addressable locations, each location corresponding to each data block in said memory and each location having a one-to-one correspondence with a data block in said memory; and
control logic connected to the memory which examines the tag bit when the second data block is written to the memory and provides a signal that the first element has been overwritten.

* * * * *